March 2, 1948.  C. V. BRADY ET AL  2,437,185
METHOD OF MAKING LABELED BAGS AND THE LIKE
Original Filed Feb. 21, 1945  5 Sheets-Sheet 1

Charles V. Brady,
August F. Ottinger,
Inventors.
Haynes and Koenig,
Attorneys.

March 2, 1948.  C. V. BRADY ET AL  2,437,185
METHOD OF MAKING LABELED BAGS AND THE LIKE
Original Filed Feb. 21, 1945    5 Sheets—Sheet 2

Charles V. Brady,
August F. Ottinger,
Inventors.
Haynes and Koenig,
Attorneys.

March 2, 1948.  C. V. BRADY ET AL  2,437,185
METHOD OF MAKING LABELED BAGS AND THE LIKE
Original Filed Feb. 21, 1945  5 Sheets-Sheet 3
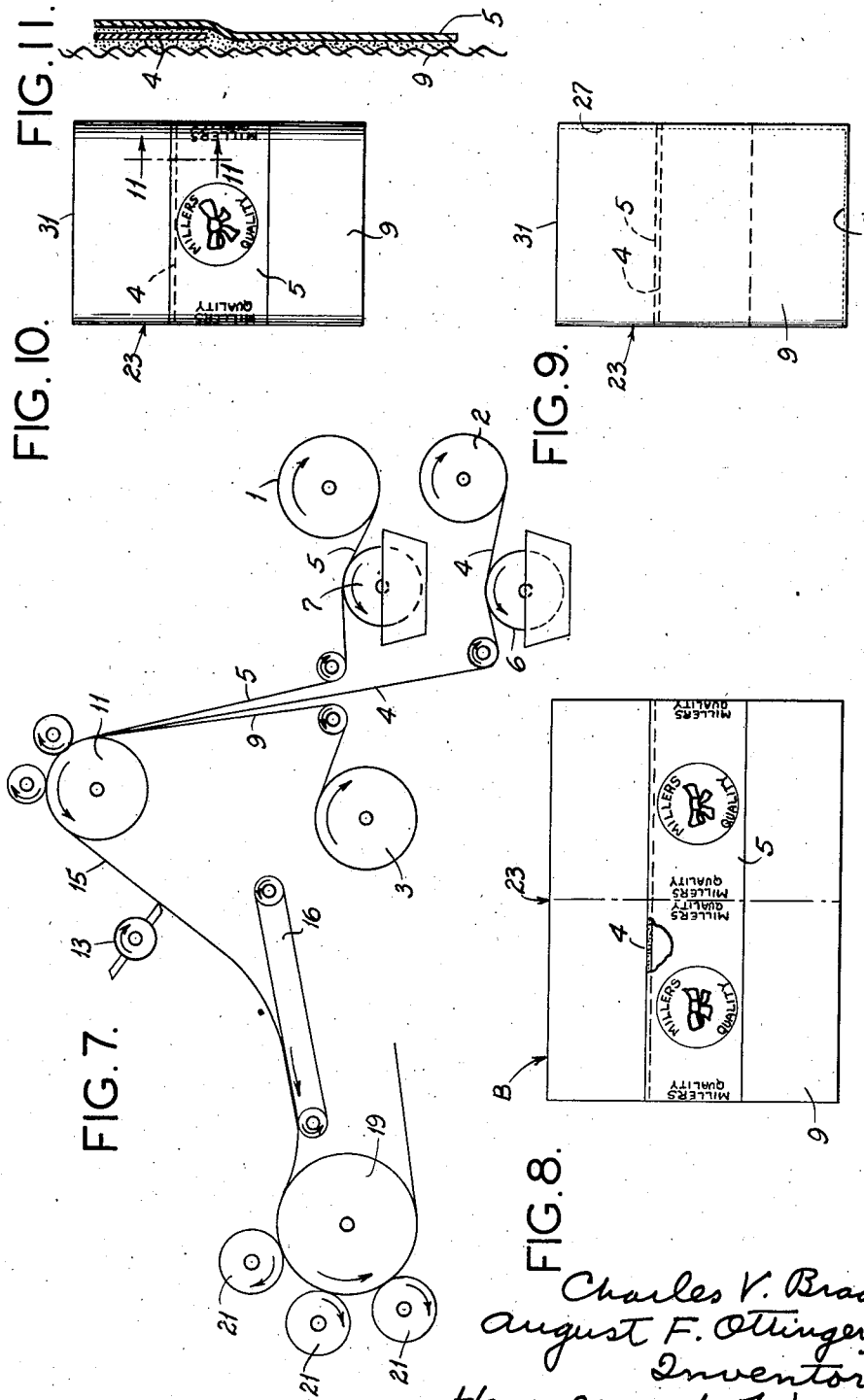

March 2, 1948. C. V. BRADY ET AL 2,437,185
METHOD OF MAKING LABELED BAGS AND THE LIKE
Original Filed Feb. 21, 1945 5 Sheets-Sheet 4

Charles V. Brady,
August F. Ottinger,
Inventors.
Haynes and Koenig,
Attorneys.

March 2, 1948.   C. V. BRADY ET AL   2,437,185
METHOD OF MAKING LABELED BAGS AND THE LIKE
Original Filed Feb. 21, 1945   5 Sheets-Sheet 5

Patented Mar. 2, 1948

2,437,185

UNITED STATES PATENT OFFICE 2,437,185

METHOD OF MAKING LABELED BAGS AND THE LIKE

Charles V. Brady and August F. Ottinger, St. Louis, Mo., assignors to Bemis Bro. Bag Company, St. Louis, Mo., a corporation of Missouri Original applications May 10, 1944, Serial No. 535,004, and February 21, 1945, Serial No. 578,976. Divided and this application February 9, 1946, Serial No. 646,577

5 Claims. (Cl. 112—10)

This invention relates in general to the manufacture of bags and the like, and more specifically to a method of making labeled articles of this class.

This application is a division of our United States patent applications as follows: Serial No. 535,004, filed May 10, 1944, for Labeled bags (now abandoned); and Serial No. 578,976, filed February 21, 1945, for Labeled fabric bags and the like.

Among the several objects of the invention may be noted the provision of a manufacturing method for a bag or the like in which a label is improvedly attached for better presentation as a belt presenting a substantial display area; the provision of a method of the class described which may be carried out automatically at high speeds; the provision of such a method for making a labeled bag or the like in which the label is presented as a continuous band around the bag or the like, said band in cases requiring it being reinforced; the provision of a labeled article of this class from which the label may readily be removed and the bag or the like preserved for subsequent use or reuse; and the provision of an economical article of this class. Other objects will be in part obvious and in part pointed out hereinafter.

The invention accordingly comprises the elements and combinations of elements, steps and sequence of steps, features of construction and manipulation, and arrangements of parts which will be exemplified in the structures and methods hereinafter described, and the scope of the application of which will be indicated in the following claims.

In the accompanying drawings, in which are illustrated several of various possible embodiments of the invention, Fig. 1 is a diagrammatic layout showing how, according to one form of the invention, label material is applied to a bag-forming web;

Fig. 7 is a view similar to Fig. 1 showing a method for producing a reinforced label;

Figure 1:
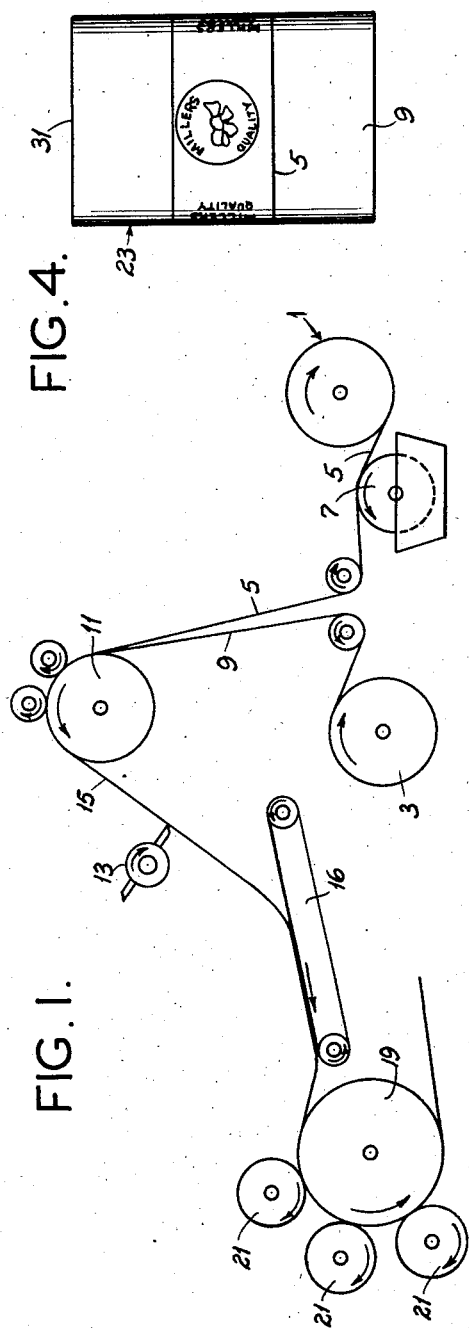
Figure 13:
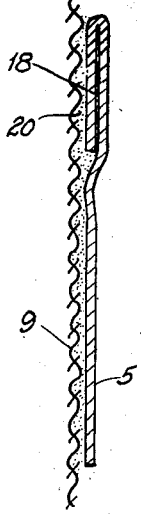
Figure 12:
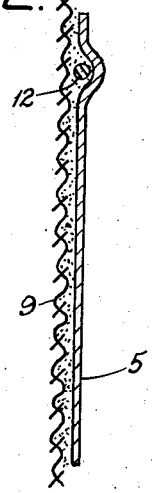
Figure 15:
Figure 14:
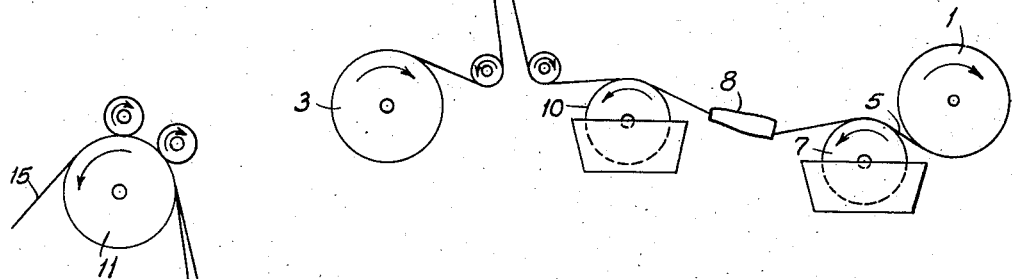
Figure 16:
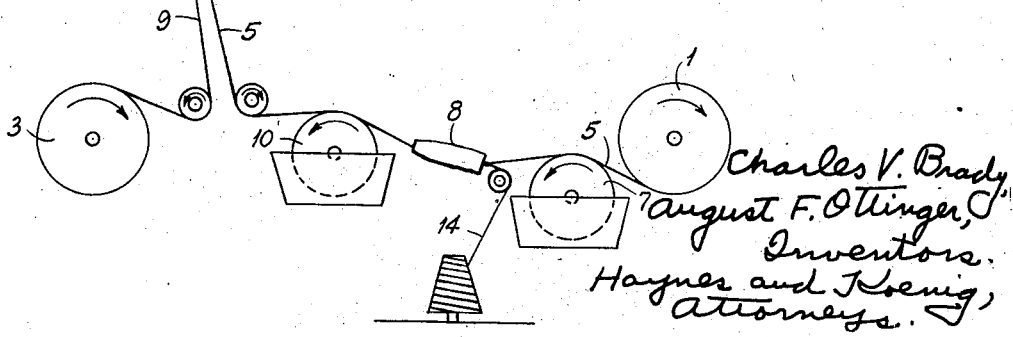
Figure 17:
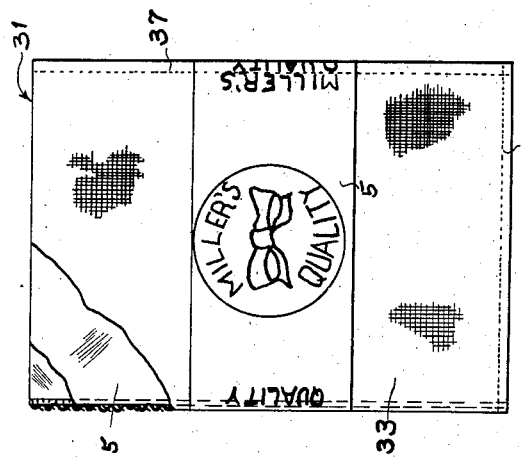
Figure 18:
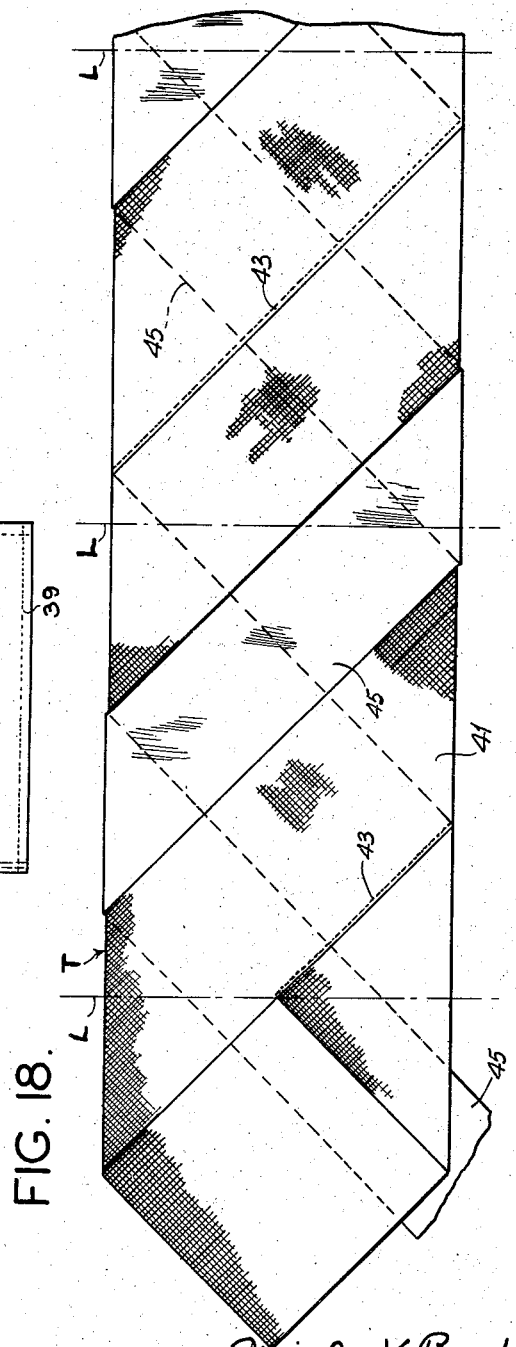

Figs. 8, 9 and 10 are views respectively similar to views 2, 3 and 4, showing said reinforced label;

Fig. 11 is an enlarged detail section taken on line 11—11 of Fig. 10;

Fig. 12 is a view similar to Fig. 11 but showing another form of reinforcement;

Fig. 13 is a view similar to Fig. 11 but showing another alternative form of reinforcement;

Fig. 14 is a fragmentary view similar to Fig. 1 showing a method of making the Fig. 13 form of the invention;

Fig. 15 is a view similar to Fig. 11 but showing the reinforcement consisting of a combination of the reinforcements of Figs. 12 and 13;

Fig. 16 is a fragmentary view similar to Fig. 1 showing a method of making the Fig. 15 form of the invention;

Fig. 17 is a face view of a lined bag with exterior seams incorporating the invention, being partially cut away to show the lining; and, Fig. 18 is a face view of a segment of a helically-seamed tubing incorporating the invention.

Similar reference characters indicate corresponding parts throughout the several views of the drawings.

Referring now more particularly to Fig. 1, there is shown at numeral 1 a supply roll of a label-forming paper strip 5 on which printing is to be applied. At numeral 3 is shown a supply roll of bag-forming web material 9. This material is preferably composed of fabric. It is of a width corresponding approximately to the finished bag length. The width of the paper strip 5 is narrower than that of the web 9 and is more or less centrally positioned with respect thereto. Its width is of ordinary label width, as will appear.

The printing to be applied on the paper strip 5 of the roll 1 is that which is desired on the outside of the finished label. The opposite non-printed face of the strip 5 passes over an adhesive-applying roll 7. The web 9 which is drawn from the roll 3 is then combined with the strip 5 at a combining and measuring roll 11.

At 13 is shown a cutter timed with the measuring roll 11 for segmenting the composite web 15. The roll 11 and the cutter 13 are timed with respect to one another such that segmentation occurs at desired intervals to produce the lengths desired.

From the cutter 13, the segmented pieces pass to a conveyor 16 and then to an impression cylinder 19 of a printing press. The plate cylinders 21 of the press cooperate with the exposed face of the paper strip 5 and apply the desired label imprints thereon. The result is the printed, labeled, bag-forming blank shown in Fig. 2 consisting in the fabric part 9 and the adhered label-forming band 5.

Figures 3, 4:
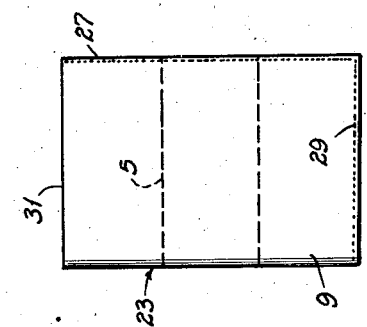
Fig. 3 is a plan view showing a bag folded inside out and sewn from the blank of Fig. 2.
Fig. 4 is a view similar to Fig. 3 showing the bag as finally turned for use.

Next, the blank, which is now indexed in general as B, is folded along a central fold line 23 with the label strip inside, as indicated in Fig. 3. Thus one side of a bag is formed by the fold line 23. The other side is formed by stitching 27 and the bottom is formed by stitching 29. The top 31 is left open for filling. This produces a bag which is inside out, the label being located inside. The label strip 5 is not only attached to the web by means of the adhesive but also by a part of the stitching 27.

Next, the bag is turned inside out as shown in Fig. 4, which places the cut edges and selvage beyond the stitching 27 and 29 inside of the bag and provides a neat appearance with the label outside.

Figure 5:
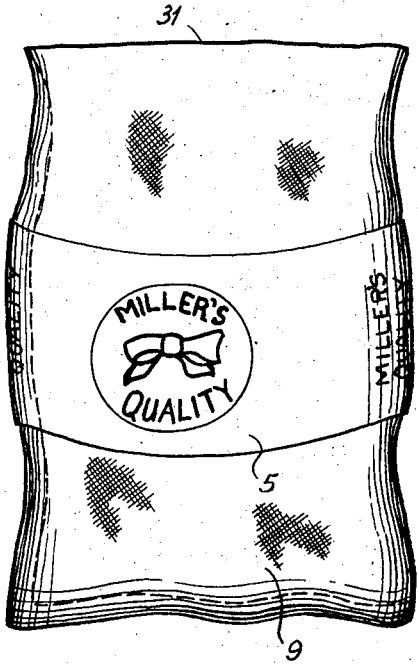
Fig. 5 is a front elevation of a filled and closed bag.

Then the bag may be filled as indicated in Fig. 5 and closed by any of the various means available for that purpose.

The resulting banded form of label is advantageous since, not only is it adhered to the fabric of the bag, but it is also held endwise by means of the stitching. The point at which the label is stitched presents as neat an appearance exteriorly as the adjacent turned seam of the bag.

Figure 6:
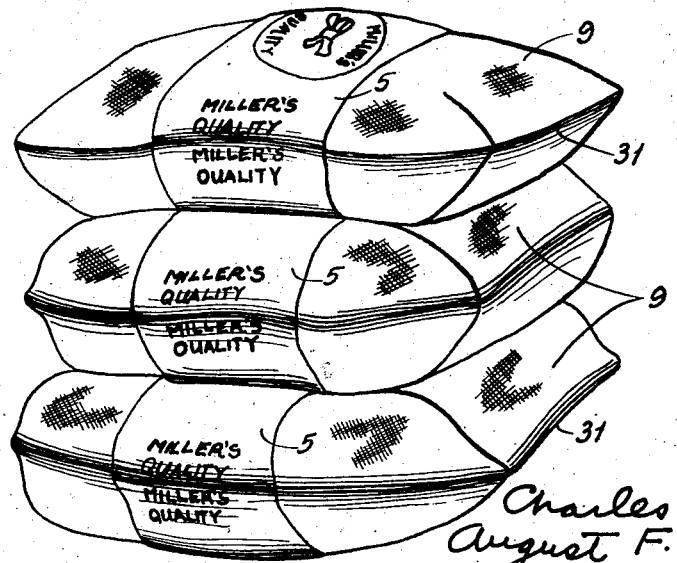
Fig. 6 shows a stack of bags, illustrating the better label presentation made by means of the invention.

By means of the invention added areas are provided on the edges of the bag at which printing may be presented to view when bags are stacked, as indicated at Fig. 6. Considering the central bag of the stack, it will be seen that all labeled portions on the front and back of the bag are hidden, but the present form of banded label still presents indentification at the bag edges. This is done with a very neat appearance, even where the label is stitched in with the seam.

If desired, the printing, instead of being done on the strip 5 after application to the web 9 may be done before application. For example, the roll I may consist of a pre-printed strip. In this event, the completely labeled bag blank will issue from the cutter 13, instead of passing from it to the printing press. In this case the cutter 13 is timed with respect to the printing on the label for proper spacing of the printing around the resulting bag.

Also, if desired the paper label-forming strip in the roll I may be of the dry-gummed variety requiring only moistening prior to bringing it into engagement with the bag-forming fabric web 9. Thus either or both adhesive and printing may be carried on the strip in the roll I.

Another advantage of the product of the invention is that a large printing area is presented by the label, and it also acts as a protective girthwise band around the bag fabric.

It should be understood that today many bags are composed of so-called dress prints made in fast colors, which after a bag has served its purpose may be used for making clothing and the like. In bags of this class, the user rips open a seam and uses for dressmaking what formerly was the bag blank. This process may be continued when the present invention is used by making the adhesive for the label water-soluble so that the label may be removed.

In addition, by making the paper of the label of a character which will not disintegrate appreciably while the label is soaked off (and such papers are available) the paper itself may be put to use, as well as the fabric. By scalloping its edges and providing suitable edgewise decoration on the front or back, it is possible to use this paper after drying as shelf paper or the like. The colors in the fabric being fast, the soaking will not ruin them. Such use of the paper, as well as the stated dress use of the fabric, is useful in farming communities.

It will be noted that by having the edges of the label caught and turned in with the inturned bag seam, no label end edge is exposed outside of the bag. Such end edges, being relatively short, often initiate peeling by contact with surrounding articles, particularly under conditions of rough handling. The present invention avoids this contingency.

In Figs. 7-10 is shown another form of the invention in which an edge of the banded label is reinforced. While both edges could be reinforced, it is more economical to reinforce only one, and we have found that generally the only one that requires reinforcement, when such is needed, is the one adjacent the bag mouth. This is because for some reason not quite clear it is this edge of label when made from certain kinds of paper that tends to tear during the bag-turning operation. The first type of reinforcement is shown in said Figs. 7-10. In these figures, reference characters like those shown in Figs. 1-4 have been used so far as possible.

In regard to these figures, at numeral 2 is shown a supply roll of a narrow reinforcing strip 4, made of paper for example. This passes over an adhesive-applying roll 6. The paper strip 4 is placed in the plane of one edge of the label strip 5. It is combined at the roll 11 with said strip 5 and the fabric material 9. Thus the strips 4, 5 and 9 are combined to form the composite web 15, the strip 4 forming a reinforcement at one edge of the label strip 5. Thus the paper strip 4 forms a reinforcement for the upper edge of the label strip 5 (Fig. 8). The position of this strip below the label strip is shown at the broken-away portion in Fig. 8. The adhesive applied to the label strip 4 attaches it to the fabric strip 9 and the adhesive on the label strip 5 attaches it to the outside of the reinforcing strip 4.

Figure 2:
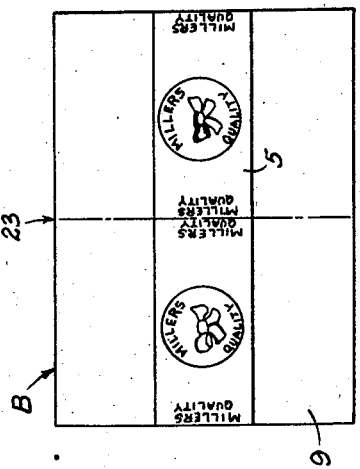
Fig. 2 is a plan view of a bag blank showing a label applied thereto.

Figs. 8, 9 and 10 are similar to Figs. 2, 3 and 4, in that they show how the reinforced labeled blank is folded over with a reinforced label inside (Fig. 9), and then turned inside out to produce the bag (Fig. 10). Thus a labeled bag is produced (Fig. 10) not unlike that of the original form of the invention (Fig. 4), except that the edge of the label closest to the bag mouth 31 is reinforced. The reinforcement, like the label itself, is caught by the side seam of the bag and is located inside of the bag where caught. The nature and position of the reinforcement is shown enlarged in Fig. 11.

In Fig. 12 is shown a form of the invention in which a cord 12 is substituted for the strip 4 and forms the edge reinforcement. No diagrammatic view of the assembling operations is shown for this form of the invention because it would be quite similar to that shown in Fig. 1 wherein the cord 12 would be substituted for the strip 4.

In Fig. 13 is shown a form of the invention in which the reinforcing strip is formed by turning under the edge 18 of the label strip, instead of feeding in a separate strip as in Fig. 7. The method of making this form of the invention is diagrammatically illustrated in Fig. 14, wherein like numerals designate like parts. The label strip 5 comes from the supply roll I and (as in Fig. 1), adhesive is applied by means of the adhesive roll 7. The edge 18 of the label strip 5 is turned under, adhesive to adhesive, this being done in an ordinary edge-turning former or folder 8. Since the bottom of the turned-under edges is then without adhesive, a narrow adhesive roll 10 is then traversed to supply adhesive over this outside area. From this point on, the process is the same as that already described.

In Fig. 15 is shown another form of the invention in which has been effected a combination of the Fig. 12 and Fig. 13 forms. In this case a cord 14 is used as a reinforcement within a folded-under edge portion 18 of the label strip 5. This form of the invention may be constructed as diagrammed in Fig. 16, wherein like numerals designate like parts. In this case, as the edge of the label strip 5 approaches the edge former or folder 8, cord 14 is fed into the re-entrant-formed angle where the edge is being turned under. Thus the cord is enclosed by the re-entrant angle and adhesive therein. Thereafter the turned-over and reinforced label strip 5 passes over the adhesive roll 10 and has an adhesive stripe 20 applied over it. This forms the construction shown in Fig. 15, which is doubly reinforced by the turned-over strip edge 18 and the enclosed cord 14.

It will be understood that if desired a paper strip such as 4 in Fig. 11 may be enclosed in a re-entrant folded part such as 18.

In Fig. 17 is shown how the label is incorporated in a lined bag which during manufacture is not turned inside out and is finally left with outside seams. In this case the label may or may not be reinforced and Fig. 17 shows an example where reinforcement is not employed. The label strip 5 is run together with the bag-forming strip which has previously been combined with a paper strip of equal width and adhesively attached. This forms a composite bag material of fabric 33 and paper 35, the latter acting as a liner when the blank is folded over to form the bag, as indicated in Fig. 17. When the strips 5, 33 and 35 are run together, 33 is in between 5 and 35. Thus when the blank is folded to form the bag shown in Fig. 17, the paper strip 35 constitutes the liner and the fabric strip 33 the outside. The folding of the blank is done so that the label 5 is outside and there it remains, since after seaming the bag on the side as indicated at 37 and on the bottom as indicated at 39, the bag is not turned inside out. It will be noted, however, that the label is in the form of a continuous strip around the bag, which is caught by the side seam. It has the same advantages as described in connection with Figs. 1-4, namely, that the label may be assembled as a continuous web with the bag blank-forming material. As above mentioned in connection with the form of the invention shown in Figs. 1-4, the adhesive for attaching the strip 5 may be water-soluble so that it may be soaked off for subsequent use of the bag material. In this case it is desirable to have the adhesive which holds the bag-forming strips 33 and 35 also water-soluble so that the paper liner 35 can be soaked off. Thus a housewife may remove the threads from the seams and have dress cloth, particularly if the material 33 is made of some decorative print material.

Also, and particularly in the case of the use of a burlap fabric for bag material 33, the label strip 5 and the liner 35 may be attached with a light application of adhesive. Such an application on burlap, which has a hairy surface, allows the user to rip off the label without soaking and likewise to rip out the liner. Thus he has available an interiorly clean, all-fabric bag without an outside label. This he may use again.

In Fig. 18 is shown an application of the invention to helically-seamed tubing which may be made up as described in the U. S. Patent 2,260,816, dated October 28, 1941, and used either as cover material or cut up to form bags. In this case, the fabric web 41 is ultimately bias-seamed as shown at 43 to form bias-seam tubing T. This may or may not be lined and is shown unlined. Before this web is bias-seamed to form the tubing, it has run together with it the label-forming strip indicated at 45. The continuous web with the label strip attached is bias-seamed with the label strip outside, thus forming the continuous helical label shown in Fig. 18. The tubing may then be used by stretching a length of it over an article and tying it beyond the article at both ends; or it may be cut up at points such as indicated by the dotted lines L and the resulting blanks seamed at one end to form bags. In either case the label is located helically (either on the bag or the cover used in the tubing form). The helically-seamed tubing may also be made with the pre-attached label strip inside; and then turned inside out, as taught in U. S. Patent 2,314,-202, dated March 16, 1943. This modification of the invention clearly illustrates one of the important advantages, which is that the label strip is run together with the package-forming strip prior to formation of the article in which packaging is effected. Also, since the label is adhered throughout the entire length of the web which forms the bag or tubing, it has a large adhesive area and a large display area. The helically seamed product forms the subject of our United States patent application Serial No. 2,948, filed January 17, 1948, for Packaging material and the products thereof.

From the above it will be seen that several forms of labeled coverings are formed, namely, bags and helically-seamed tubing; in each of which is employed a continuous outside label band located intermediate the edges of the web of which these coverings are formed. In both cases manufacture is facilitated by combining the label-forming strip with the cover-forming web prior to manipulating the combination in order to form the particular cover device, be it bag or tubing. The method, furthermore, gives a satisfactory range of choice in the manner in which the label is presented. For example, in Figs. 4, 10 and 17 it is presented as a straight girthwise band, whereas in Fig. 18 it is presented as an angularly located band. Hereinafter the term tubular cover member should be understood to refer both to bags and cover tubing.

In view of the above, it will be seen that the several objects of the invention are achieved and other advantageous results attained.

As many changes could be made in the above construction without departing from the scope of the invention, it is intended that all matter contained in the above description or shown in the accompanying drawings shall be interpreted as illustrative and not in a limiting sense.

We claim:

1. The method of applying labels to and forming bag-like coverings for packaging comprising withdrawing from a supply a continuous web of cover-forming material; withdrawing from a second supply a continuous narrower strip of label-forming material; continuously adhesively combining the web with the label-forming strip between and spaced from the edges of the web;

transversely cutting the combined web and strip into a bag-forming blank; folding said blank into bag form with its strip inside; stitching the edges of said folded blank to form a bag seam with both ends of said strip caught in the seam; and turning the bag so formed inside out to present the label strip on the outside but caught in the seam.

2. The method of applying labels to and forming bags comprising withdrawing from a supply a continuous web of cover-forming material; withdrawing from a second supply a continuous substantially narrower strip of label-forming material; longitudinally continuously adhesively combining the web with the label-forming strip between the edges of the web; transversely cutting the combined web and strip into bag-forming blanks; transversely folding each blank into bag form with the strip inside; stitching the edges of said folded blank to form longitudinal and bottom seams with both ends of said strip caught in the longitudinal seam; and turning inside out the bag so formed to present the label strip girthwise on the outside but caught at both ends in the seam.

3. The method of applying labels to and forming bag-like coverings for packaging comprising withdrawing from a supply a continuous web of cover-forming material; withdrawing from a second supply a continuous narrower strip of label-forming material; continuously folding at least one edge of the label-forming strip as it is withdrawn from its supply in order to reinforce said edge; continuously adhesively combining the reinforced web with the label-forming strip, the label-forming strip being located between and spaced from the edges of the web, transversely cutting the combined web and reinforced strip into a bag-forming blank; folding said blank into bag form with its reinforced strip inside; stitching the edges of said folded blank to form a bag seam with both ends of said strip including its reinforcement being caught in the seam; and turning the bag so formed inside out to present the reinforced label strip on the outside but caught with its reinforcement in the seam.

4. The method of applying labels to and forming bag-like coverings for packaging comprising withdrawing from a supply a continuous web of cover-forming material; withdrawing from a second supply a continuous narrower strip of label-forming material; withdrawing from a third supply a continuous length of still narrower reinforcing material, continuously adhesively combining the web with the label-forming strip while continuously adhesively combining the reinforcing material with one edge portion of the label-forming material, the label-forming strip being located between and spaced from the edges of the web; transversely cutting the combined web and reinforced strip into a bag-forming blank; folding said blank into bag form with its reinforced strip inside; stitching the edges of said folded blank to form a bag seam with both ends of said strip including its reinforcement caught in the seam; and turning the bag so formed inside out to present the reinforced label strip on the outside but caught with its reinforcement in the seam.

5. A method according to claim 4, incorporating the step of continuously folding around the reinforcing material the edge of the label-forming strip which is to be reinforced, as the web and the label-forming strip are combined with the web.

CHARLES V. BRADY.
AUGUST F. OTTINGER.

REFERENCES CITED

The following references are of record in the file of this patent:

UNITED STATES PATENTS

| Number | Name | Date |
| --- | --- | --- |
| 445,329 | Kerr | Jan. 27, 1891 |
| 2,000,989 | Royal | May 14, 1935 |
| 2,178,557 | Burns | Nov. 7, 1939 |

FOREIGN PATENTS

| Number | Country | Date |
| --- | --- | --- |
| 261,858 | Great Britain | Nov. 30, 1926 |